United States Patent
Fukaya et al.

(10) Patent No.: US 9,350,219 B2
(45) Date of Patent: May 24, 2016

(54) ROTOR MAGNET, ROTOR, AND ROTOR MANUFACTURING METHOD

(75) Inventors: Tetsuyoshi Fukaya, Tokai (JP); Yasushi Nishikuma, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 961 days.

(21) Appl. No.: 13/392,353

(22) PCT Filed: Feb. 14, 2011

(86) PCT No.: PCT/JP2011/053001
§ 371 (c)(1),
(2), (4) Date: Feb. 24, 2012

(87) PCT Pub. No.: WO2012/111065
PCT Pub. Date: Aug. 23, 2012

(65) Prior Publication Data
US 2012/0274165 A1 Nov. 1, 2012

(51) Int. Cl.
| | |
|---|---|
| *H02K 21/12* | (2006.01) |
| *H02K 15/00* | (2006.01) |
| *H02K 15/03* | (2006.01) |
| *H02K 1/27* | (2006.01) |
| *H01F 41/00* | (2006.01) |
| *H01F 41/02* | (2006.01) |

(52) U.S. Cl.
CPC .............. *H02K 15/03* (2013.01); *H01F 41/005* (2013.01); *H01F 41/0253* (2013.01); *H02K 1/27* (2013.01); *H02K 1/2766* (2013.01); *Y10T 29/49012* (2015.01)

(58) Field of Classification Search
CPC ............ H02K 1/17; H02K 1/27; H02K 15/03
USPC ............. 310/156.01, 156.38, 156.43, 156.53, 310/156.56; 29/596, 598, 607
See application file for complete search history.

(56) References Cited

U.S. PATENT DOCUMENTS

2010/0013338 A1  1/2010  Takahashi
2010/0244608 A1*  9/2010  Nakamura et al. ........ 310/156.38

FOREIGN PATENT DOCUMENTS

| DE | 2835441 A1 | 2/1980 |
|---|---|---|
| DE | 102009027916 A1 | 1/2011 |
| JP | 11-220847 A | 8/1999 |
| JP | 2001-086671 A | 3/2001 |

(Continued)

OTHER PUBLICATIONS

International Search Report of PCT/JP2011/053001 mailed Apr. 26, 2011.

*Primary Examiner* — Jose Gonzalez Quinones
(74) *Attorney, Agent, or Firm* — Kenyon & Kenyon LLP

(57) ABSTRACT

A purpose is to provide a rotor manufacturing method including a magnet assembly formed of divided permanent magnet pieces to enhance insulation and advance cost reduction. The rotor manufacturing method includes forming permanent magnet pieces by dividing a permanent magnet, arranging and resin-molding the permanent magnet pieces to form a magnet assembly, and placing the magnet assembly in a rotor. The method includes placing the permanent magnet pieces all together in a molding die for use in resin-molding, and moving the permanent magnet pieces by a moving device provided in the molding die to move the permanent magnet pieces within the molding die, thereby forming the magnet assembly.

5 Claims, 8 Drawing Sheets

(56) References Cited

FOREIGN PATENT DOCUMENTS

| | | |
|---|---|---|
| JP | 2003-134750 A | 5/2003 |
| JP | 2003-164083 A | 6/2003 |
| JP | 2004-007937 A | 1/2004 |
| JP | 2005-094845 A | 4/2005 |
| JP | 2005-198365 A | 7/2005 |
| JP | 2006-320140 A | 11/2006 |
| JP | 2007-266200 A | 10/2007 |
| JP | 2009-296696 A | 12/2009 |
| WO | 2008142519 A1 | 11/2008 |

* cited by examiner

ROTOR MAGNET, ROTOR, AND ROTOR MANUFACTURING METHOD

CROSS-REFERENCE TO RELATED APPLICATIONS

This is a 371 national phase application of PCT/JP2011/053001 filed on 14 Feb. 2011, the entire contents of which are incorporated herein by reference.

TECHNICAL FIELD

The present invention relates to a technique of manufacturing a rotor to be used in a motor and more particularly to a technique of dividing a permanent magnet to be used in a rotor into permanent magnet pieces and resin-molding them to form a magnet assembly with insulation between the permanent magnet pieces.

BACKGROUND ART

In recent years, there is an increase in demands for motors to be used as drive power of vehicles. Rotors to be used in motors use permanent magnets. In the case where a motor is mounted in a vehicle for the purpose of being used for drive power, the use of a larger permanent magnet is desired to enhance motor output. Such a larger permanent magnet is however apt to cause problems with heat generation and loss due to eddy currents induced in the permanent magnet. In these circumstances, a method of using a magnet by dividing it into multiple pieces has been studied.

Patent Document 1 discloses a technique related to a permanent magnet manufacturing method, a permanent magnet piece, and a permanent magnet. In a first step, a permanent magnet to be used in an electric motor is divided into plural pieces. In a second step, an insulation coating treatment using insulating resin such as epoxy coating is applied to the periphery of the divided permanent magnet pieces. In a third step, the permanent magnet pieces are bonded with insulating adhesive applied on their division surfaces. In a fourth step, an assembly consisting of the bonded permanent magnet pieces is subjected to finishing such as grinding to form the assembly to a predetermined shape and size. In a fifth step, all surfaces of the assembly are subjected to an insulation coating treatment. In this way, the assembly of permanent magnets is formed in five steps to reliably prevent eddy currents from being induced in an electric motor.

Patent Document 2 discloses a technique related to a rare earth permanent magnet to be used for a motor and a manufacturing method thereof. A rectangular rare earth permanent magnet to be used in a motor is formed with a slit having a fixed depth and extending from one surface toward an opposite side surface to form a divided part and a yoke part that holds divided magnets at slit ends. Then, non-conductive resin is filled in the slits. The divided part and the yoke part are cut off. With this manner, a plate-like permanent magnet including a plurality of permanent magnets stacked through non-conductive resin is obtained.

Patent Document 3 discloses a technique related to a permanent magnet manufacturing method, a permanent magnet, and an electric motor using this. In a first step, for permanent magnet pieces to be used in a motor, a permanent magnet base material is processed into a predetermined shape. In a second step, the processed permanent magnet base material is formed with a plurality of grooves extending in a magnetizing direction while one end of the base material is left, thereby forming permanent magnet pieces in the other end. Since those grooves provide gaps between the permanent magnet pieces, it is possible to suppress the influence of eddy currents.

Patent Document 4 discloses a technique related to a permanent magnet motor and an elevator machine using it. A permanent magnet to be used in an elevator is configured in such a manner that strip-shaped permanent magnets are coated with an insulation material, and these coated magnets are stacked on a magnetic back yoke piece so that their stacked cross sections are exposed. Thus, the strip-shaped permanent magnets are stacked and placed on the surface of back yoke piece, in which respective permanent magnets are coated. This configuration can suppress the influence of eddy currents.

Patent Document 5 discloses a technique related to a magnet for a motor, its fixing method, and a motor. Around a required peripheral surface of a magnet assembly consisting of a plurality of magnet pieces that are arranged in contact into a desired shape, a high-strength fiber band made of for example aramide fibers, the ends of the band having been impregnated with resin in advance, is wound and integrally fastened by heat welding. Since this fiber band is impregnated with resin in advance and is thermally welded, the magnet pieces can be fastened tightly. Even when magnetized after assembling, the magnets are not dissolved due to their repulsive forces. The number of division is increased and thus eddy currents can be reduced. Accordingly, a motor with reduced eddy current loss can be obtained.

Patent Document 6 discloses a technique related to a magnet composite structure. A plurality of permanent magnets are placed on a substrate made of stainless steel or plastics or the like and bent in an L shape. The substrate and the permanent magnets are bonded with an adhesive sheet or pressure-sensitive adhesive sheet having adhesive properties or an adhesive layer. With this configuration, it is possible to suppress the generation of heat or loss due to eddy currents resulting from an increase in magnet size.

RELATED ART DOCUMENTS

Patent Documents

Patent Document 1: JP 2003-134750A
Patent Document 2: JP 2005-198365A
Patent Document 3: JP 2006-320140A
Patent Document 4: JP 11(1999)-220847A
Patent Document 5: JP 2001-86671A
Patent Document 6: JP 2007-266200A

DISCLOSURE OF THE INVENTION

Problems to be Solved by the Invention

However, forming the permanent magnets to be used in a motor by use of the techniques disclosed in Patent Documents 1 to 6 may cause the following problems.

In the techniques disclosed in Patent Documents 1 to 6, eddy currents induced in the permanent magnets resulting from an increase in permanent magnet size are suppressed by dividing of the permanent magnets. However, such methods as shown in Patent Documents 1 to 3 of cutting out the plurality of permanent magnet pieces from a large permanent magnet or forming the slits need multiple steps to cut the permanent magnet, apply insulation coating, and further grind the magnet to a desired shape and size. It is therefore difficult to reduce the costs of a motor.

On the other hand, the techniques in Patent Documents 4 to 6 are based on an idea of stacking the small permanent magnet pieces. Accordingly, such a small permanent magnet piece needs the accuracy of form and requires a predetermined step for that forming. As a result, these techniques are not considered to reduce the manufacturing costs as compared with Patent Documents 1 to 3. Further, the permanent magnet pieces have to be reduced in size in order to prevent the generation of eddy currents; however, as the small-sized permanent magnet pieces are smaller, the permanent magnet pieces are harder to individually handle. Thus, a work of applying insulation to the permanent magnet pieces or others may be more difficult. That is, when the permanent magnet pieces are reduced in size for the purpose of high output of a motor by use of the techniques disclosed in Patent Documents 4 to 6, the aforementioned disadvantages in manufacturing are conceivable.

Therefore, the applicants proposed a method of forming permanent magnet pieces by splitting a permanent magnet to suppress heat generation and loss due to eddy currents. Since this method does not need an additional process such as grinding or insulation treatment to the split surface of each permanent magnet piece, it is expected to enhance yields and reduce the number of steps. It can contribute to cost reduction. However, the applicants experimentally found an issue that the resistance of boundary faces in split surfaces of the divided permanent magnet pieces obtained by this method was lower than that of permanent magnet pieces obtained by machining and thus higher insulation properties were necessary. This is conceivably because, as a result of using the split permanent magnet with the adjacent split surfaces being in the same relationship, oxide coating or layer is less likely to be formed on those split surfaces because of various circumstances; the irregularities of the split surfaces engage with each other, the magnet is split along grain boundaries or the like, or the split surfaces are mated with each other immediately after splitting. This causes the need to additionally apply the insulation treatment to the split surfaces for high output of motor, but the issue with handling or others mentioned above also come about. It is therefore necessary to carefully consider such addition of the insulation treatment.

The present invention has been made to solve the above problems and has a purpose to provide a rotor including a magnet assembly consisting divided permanent magnet pieces and with enhanced insulation properties and reduced costs, a rotor manufacturing method, and a rotor magnet.

Means of Solving the Problems

To achieve the above purpose, one aspect of the invention provides the following configurations.

(1) In a method of manufacturing a rotor including: dividing a permanent magnet into a plurality of permanent magnet pieces; arranging and resin-molding the permanent magnet pieces to form a magnet assembly; and placing the magnet assembly in a rotor, the method comprises: placing the permanent magnet pieces all together in a molding die for use in resin-molding; and moving the permanent magnet pieces within the molding die by moving means for moving the permanent magnet pieces to form the magnet assembly, the moving means being provided in the molding die.

(2) In the rotor manufacturing method described in (1), preferably, the permanent magnet pieces are formed by splitting the permanent magnet, the molding die is provided with a gate through which a resin for resin-molding flows in the molding die, and the gate serves as the moving means.

(3) In the rotor manufacturing method described in (2), preferably, the gate includes a plurality of gates provided in the molding die, the plurality of gates include a first gate provided in a surface of the die facing a side surface of a first permanent magnet piece of the permanent magnet pieces and a second gate provided on a surface of the die facing a side surface of a second permanent magnet piece located adjacent to the first permanent magnet piece, the first gate and the second gate are provided in opposite surfaces of the molding die, and after the permanent magnet pieces are placed in the molding die, the resin is supplied in the molding die through the first gate and the second gate to move the first permanent magnet piece and the second permanent magnet piece in opposite directions so that the permanent magnet pieces are resin-molded to form the magnet assembly.

(4) In the rotor manufacturing method described in (2) or (3), preferably, pins for supporting the side surfaces of the permanent magnet pieces are provided in the number corresponding to the number of the permanent magnet pieces to be placed in the molding die, the pins include a first pin placed in a surface of the die facing a side surface of the first permanent magnet piece of the permanent magnet pieces and a second pin placed in a surface of the die facing a side surface of the second permanent magnet piece located adjacent to the first permanent magnet piece, the first pin and the second pin are placed respectively in opposite surfaces of the molding die, after the permanent magnet pieces are placed in the molding die, the first pin and the second pin are moved to positions short of the corresponding permanent magnet pieces, the resin for resin-molding is supplied in the molding die to move the first permanent magnet piece into contact with the first pin and the second permanent magnet piece into contact with the second pin to form the magnet assembly.

(5) In the rotor manufacturing method described in (1), preferably, the molding die is provided with a plurality of gates through which a resin for resin-molding flows in the molding die, the gates being the moving means, the gates are located in one surface of the molding die and spaced at intervals corresponding to vicinities of mating surfaces of the adjacent permanent magnet pieces, and after the permanent magnet pieces are placed in the molding die, the resin for use in resin-molding is supplied in the molding die to flow between the mating surfaces of the adjacent permanent magnet pieces to flow the magnet assembly.

(6) In the rotor manufacturing method described in (1), preferably, the molding die is provided with a movable die for moving the permanent magnet pieces as the moving means, the movable die being placed in an end of the permanent magnet pieces in a stack direction thereof, a cavity defined by the molding die and the movable die is formed with a size larger than a final size of the magnet assembly in the stack direction of the permanent magnet pieces, after the permanent magnet pieces are placed in the molding die, the permanent magnet pieces are moved by another moving means to widen intervals between the permanent magnet pieces, and after the resin for resin-molding is supplied in the molding die, the movable die is moved toward the placed permanent magnet pieces to reduce the cavity so that the magnet assembly is formed with a predetermined size.

To achieve the above purpose, another aspect of the invention provides a rotor configured as below.

(7) In a rotor including a magnet assembly formed in a manner that a plurality of permanent magnet pieces obtained by dividing a permanent magnet are arranged and resin-molded, the permanent magnet pieces are formed by splitting the permanent magnet, the permanent magnet pieces include a first permanent magnet piece and a second permanent magnet piece that are placed adjacent to each other so that split surfaces face each other in a positional relationship equal to that before the permanent magnet is split, and the first permanent magnet piece and the second permanent magnet piece are displaced in a direction parallel to the split surfaces to form the magnet assembly.

To achieve the above purpose, another aspect of the invention provides a rotor magnet configured as below.

(8) In a rotor magnet including a plurality of permanent magnet pieces obtained by dividing a permanent magnet are arranged and resin-molded, the permanent magnet pieces are formed by splitting the permanent magnet, the permanent magnet pieces include a first permanent magnet piece and a second permanent magnet piece that are placed adjacent to each other so that respective split surfaces face each other in a positional relationship equal to that before the permanent magnet is split, and the first permanent magnet piece and the second permanent magnet piece are displaced in a direction parallel to the split surfaces.

Effects of the Invention

The rotor manufacturing method in one aspect of the invention configured as above can provide the following operations and effects.

The aspect of the invention described in (1) is a method of manufacturing a rotor including: dividing a permanent magnet into a plurality of permanent magnet pieces; arranging and resin-molding the permanent magnet pieces to form a magnet assembly; and placing the magnet assembly in a rotor, wherein the method comprises: placing the permanent magnet pieces all together in a molding die for use in resin-molding; and moving the permanent magnet pieces within the molding die by moving means for moving the permanent magnet pieces to form the magnet assembly, the moving means being provided in the molding die.

When the permanent magnet pieces are to be resin-molded, the permanent magnet pieces are placed all together in the molding die and moved within the molding die by the moving means. Placing the permanent magnet pieces all together can solve difficulty in handling. This can reduce lead time as compared with one-by-one handing of the permanent magnet pieces and accordingly contribute to cost reduction of a motor.

Since the permanent magnet pieces are moved to appropriate positions by the moving means, the magnet assembly can be formed with appropriate insulation between the permanent magnet pieces. Specifically, it is necessary to appropriately insulate the adjacent permanent magnet pieces from each other. Therefore, for the purpose of providing resin used for insulating resin-molding with appropriate thickness between the permanent magnet pieces, resin-molding is performed after the permanent magnet pieces are moved by the moving means or the permanent magnet pieces are moved by the moving means during resin-molding. Accordingly, the magnet assembly can be formed with desired insulating properties. Not only in the case of using permanent magnet pieces whose peripheries are not formed with insulation layers but also in the case of using permanent magnet pieces obtained by splitting a permanent magnet, the magnet assembly having an insulation layer with an appropriate thickness can be formed. As a result, a manufacturing step can be reduced, contributing to cost reduction of a motor.

The aspect of the invention described in (2) is, in the rotor manufacturing method described in (1), that the permanent magnet pieces are formed by splitting the permanent magnet, the molding die is provided with a gate through which a resin for resin-molding flows in the molding die, and the gate serves as the moving means.

Since the permanent magnet is split into the permanent magnet pieces, there is no need to perform a cutting step of cutting the permanent magnet and a mechanical step such as grinding to a portion corresponding to a split surface. This can contribute to cost reduction of a motor. Further, the permanent magnet pieces are moved within the molding die by the moving means to form appropriate gaps and resin-molded, so that the permanent magnet pieces can be insulated from each other. This makes it possible to suppress the generation of eddy currents in the magnet assembly resulting from high power of a motor. The motor performance can be expected to enhance.

Further, since the gate for resin provided in the molding die is used as the moving means, the need to move the permanent magnet pieces within the molding die by a mechanical moving means such as a handling device is eliminated. A reduction in equipment costs can thus be expected. Since the force to flow resin from the gate is utilized to move the permanent magnet pieces, the number of process steps can be reduced, resulting in shortening of lead time. This can contribute to cost reduction of a motor accordingly.

The aspect of the invention described in (3) is, in the rotor manufacturing method described in (2), that the gate includes a plurality of gates provided in the molding die, the plurality of gates include a first gate provided in a surface of the die facing a side surface of a first permanent magnet piece of the permanent magnet pieces and a second gate provided on a surface of the die facing a side surface of a second permanent magnet piece located adjacent to the first permanent magnet piece, the first gate and the second gate are provided in opposite surfaces of the molding die, and after the permanent magnet pieces are placed in the molding die, the resin is supplied in the molding die through the first gate and the second gate to move the first permanent magnet piece and the second permanent magnet piece in opposite directions so that the permanent magnet pieces are resin-molded to form the magnet assembly.

The first gate and the second gate are located in opposite positions in the molding die. Accordingly, the first permanent magnet piece and the second permanent magnet piece are moved respectively by the pressure of resin when supplied through the gates, so that the adjacent first and second permanent magnet pieces are displaced from each other vertically in the stack direction. The first and second permanent magnet pieces have the split surfaces formed by splitting the permanent magnet. When the split surfaces of the first and second permanent magnet pieces are displaced from each other, a gap is generated between facing surfaces of the first permanent magnet piece and the second permanent magnet piece.

Each split surface is formed with irregularities. The irregularities of the first permanent magnet piece and the irregularities of the second permanent magnet piece before displacement are located so that their projections and depressions engage with each other without gaps therebetween. However, when the first and second permanent magnet pieces are displaced in opposite directions, those projections and depressions come out of engagement, thus generating gaps between the first and second permanent magnet pieces. When resin flows in those gaps, appropriate insulation layers can be formed. In the case where the permanent magnet pieces further include a number of permanent magnet pieces as well as the first and second permanent magnet pieces, the gaps are similarly formed between the adjacent permanent magnet pieces. As above, the moving means is provided by utilizing the pressure of resin to be injected from the gate. This can reduce the number of steps and contribute to cost reduction, as mentioned above.

The aspect of the invention described in (4) is, in the rotor manufacturing method described in (2) or (3), that pins for supporting the side surfaces of the permanent magnet pieces are provided in the number corresponding to the number of the permanent magnet pieces to be placed in the molding die, the pins include a first pin placed in a surface of the die facing a side surface of the first permanent magnet piece of the permanent magnet pieces and a second pin placed in a surface of the die facing a side surface of the second permanent magnet piece located adjacent to the first permanent magnet piece, the first pin and the second pin are placed respectively in opposite surfaces of the molding die, after the permanent magnet pieces are placed in the molding die, the first pin and the second pin are moved to positions short of the corresponding permanent magnet pieces, the resin for resin-molding is supplied in the molding die to move the first permanent magnet piece into contact with the first pin and the second permanent magnet piece into contact with the second pin to form the magnet assembly.

Since the first pin and the second pin are provided in the molding die, the positions of the permanent magnet pieces moved by flowing pressure of resin from the gates can be arranged to appropriate locations, thereby ensuring insulation around the magnet assembly. When the permanent magnet pieces are to be moved by injection pressure of resin from the gates, it is necessary to take a balance of the injection pressure and a moving amount of the permanent magnet pieces. Accordingly, in the case where the permanent magnet pieces are likely to move excessively by the injection pressure, such pins provided in the molding die can restrict the moving amount of the permanent magnet pieces, thereby ensuring the insulation of the magnet assembly. In the case where the permanent magnet pieces further include a number of permanent magnet pieces as well as the first permanent magnet piece and the second permanent magnet piece, the pins in the corresponding number are provided in the molding die, so that the moving amount of the permanent magnet pieces are similarly restricted.

The aspect of the invention described in (5) is, in the rotor manufacturing method described in (1), that the molding die is provided with a plurality of gates through which a resin for resin-molding flows in the molding die, the gates being the moving means, the gates are located in one surface of the molding die and spaced at intervals corresponding to vicinities of mating surfaces of the adjacent permanent magnet pieces, and after the permanent magnet pieces are placed in the molding die, the resin for use in resin-molding is supplied in the molding die to flow between the mating surfaces of the adjacent permanent magnet pieces to flow the magnet assembly.

The gates are provided in the vicinities of the mating surfaces of the permanent magnet pieces. Thus, the moving direction of the permanent magnet pieces to be moved by the injection pressure of resin from the gates can be made equal to the stack direction of the permanent magnet pieces. Since the permanent magnet pieces in the molding die are moved by the injection pressure of resin from the gates in a similar manner as the aforementioned invention, the number of equipment and the number of steps can be reduced, contributing to cost reduction of a motor. If there is a demand for increasing moving distances of the permanent magnet pieces in order to thicken the insulation layers, the positions of the gates are slightly displaced in the moving directions of the permanent magnet pieces to shift the timing of resin inflow or supply.

The aspect of the invention described in (6) is, in the rotor manufacturing method described in (1), that the molding die is provided with a movable die for moving the permanent magnet pieces as the moving means, the movable die being placed in an end of the permanent magnet pieces in a stack direction thereof, a cavity defined by the molding die and the movable die is formed with a size larger than a final size of the magnet assembly in the stack direction of the permanent magnet pieces, after the permanent magnet pieces are placed in the molding die, the permanent magnet pieces are moved by another moving means to widen intervals between the permanent magnet pieces, and after the resin for resin-molding is supplied in the molding die, the movable die is moved toward the placed permanent magnet pieces to reduce the cavity so that the magnet assembly is formed with a predetermined size.

The position of the movable die is set in advance so that the cavity is larger in the stack direction of the permanent magnet pieces than the final size of the magnet assembly. Another moving means is used to widen the intervals between the permanent magnet pieces. After the permanent magnet pieces are placed in the molding die and the resin is supplied into the molding die, the movable die is moved to a side in which the permanent magnet pieces are placed. This makes it possible to more reliably form the insulation layers between the permanent magnet pieces. In the case where the permanent magnet pieces further include a number of permanent magnet pieces as well as the first and second permanent magnet pieces, the gaps are similarly formed between the adjacent permanent magnet pieces, forming the insulation layers. Another moving means may be the gate(s) in (2) or (5) or a mechanical moving means. Since the permanent magnet pieces are moved within the molding die, an easy moving means that causes no possibility of dropping down the permanent magnet pieces during handling may be used. This is less likely to disturb cost reduction.

The rotor in another aspect of the invention configured as above can provide the following operations and effects.

The aspect of the invention described in (7) provides a rotor including a magnet assembly formed in a manner that a plurality of permanent magnet pieces obtained by dividing a permanent magnet are arranged and resin-molded, wherein the permanent magnet pieces are formed by splitting the permanent magnet, the permanent magnet pieces include a first permanent magnet piece and a second permanent magnet piece that are placed adjacent to each other so that split surfaces face each other in a positional relationship equal to that before the permanent magnet is split, and the first permanent magnet piece and the second permanent magnet piece are displaced in a direction parallel to the split surfaces to form the magnet assembly.

As described as the purpose, the permanent magnet is split to form the permanent magnet pieces to achieve cost reduction. Accordingly, the first and second permanent magnet pieces are displaced in the parallel direction to the split surfaces by taking advantage of characteristics of the split surfaces. Thus, the gap can be formed between the first and second permanent magnet pieces. In the case where the permanent magnet pieces further include a number of permanent magnet pieces as well as the first and second permanent magnet pieces, similarly, the gaps are formed between the adjacent permanent magnet pieces. Consequently, the gaps can be formed between the permanent magnet pieces by an easy moving method using for example injection pressure of resin from the gate(s). This can contribute to cost reduction of a rotor and hence cost reduction of a motor.

The rotor magnet in another aspect of the invention configured as above can provide the following operations and effects.

The aspect of the invention described in (8) provides a rotor magnet including a plurality of permanent magnet pieces obtained by dividing a permanent magnet are arranged and resin-molded, wherein the permanent magnet pieces are formed by splitting the permanent magnet, the permanent magnet pieces include a first permanent magnet piece and a second permanent magnet piece that are placed adjacent to each other so that respective split surfaces face each other in a positional relationship equal to that before the permanent magnet is split, and the first permanent magnet piece and the second permanent magnet piece are displaced in a direction parallel to the split surfaces.

As described above, the permanent magnet is split to form the permanent magnet pieces to achieve cost reduction. Accordingly, the first and second permanent magnet pieces are displaced in the parallel direction to the split surfaces by taking advantage of characteristics of the split surfaces. Thus, the gap can be formed between the first and second permanent magnet pieces. In the case where the permanent magnet pieces further include a number of permanent magnet pieces as well as the first and second permanent magnet pieces, the gaps are similarly formed between the adjacent permanent magnet pieces. Consequently, the gaps can be formed between the permanent magnet pieces by an easy moving method using for example injection pressure of resin from the gate(s). This can contribute to cost reduction of a rotor magnet and hence cost reduction of a motor.

MODE FOR CARRYING OUT THE INVENTION

A detailed description of a first embodiment of the present invention will now be given referring to the accompanying drawings.

Figure 1:
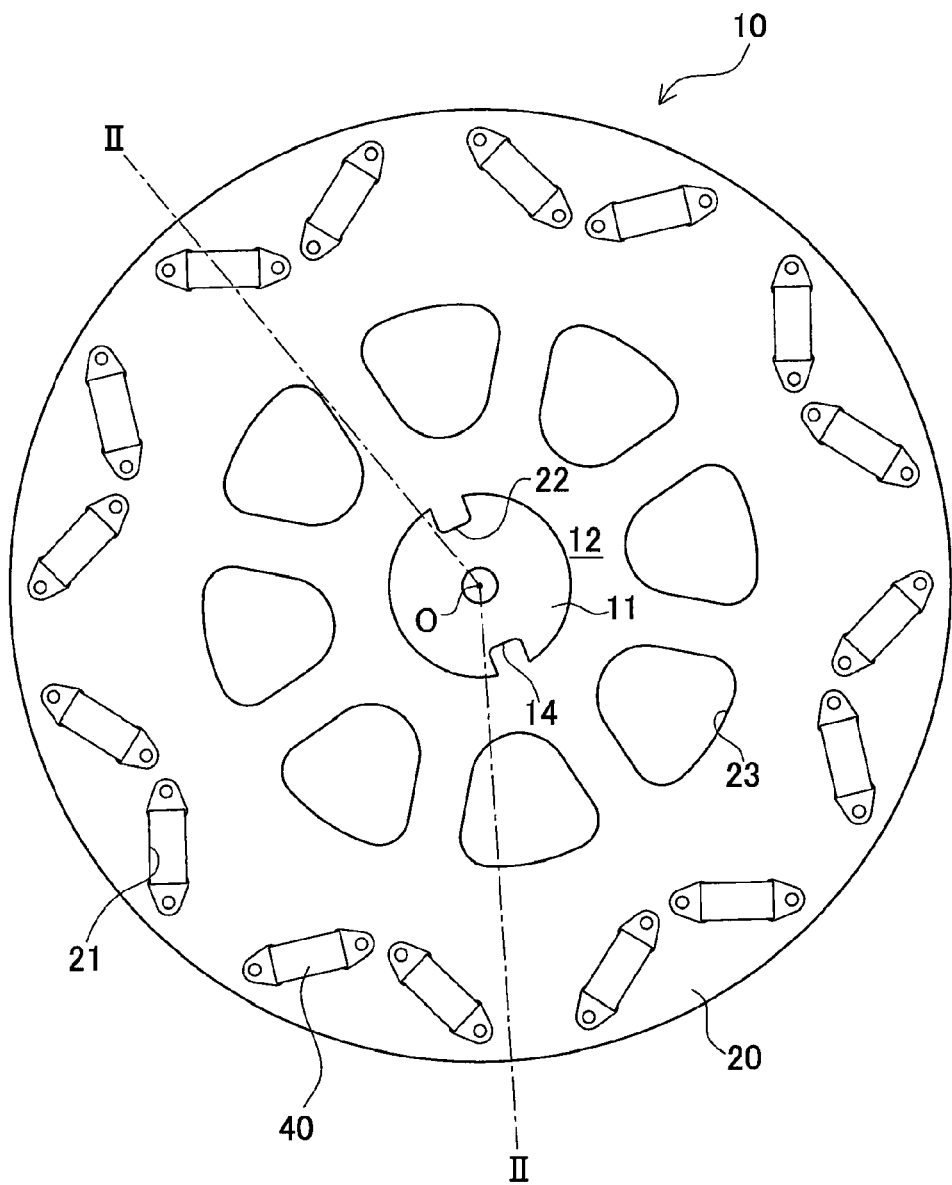
FIG. 1 is a plan view of a rotor in an axial direction in a first embodiment.
Figure 2:
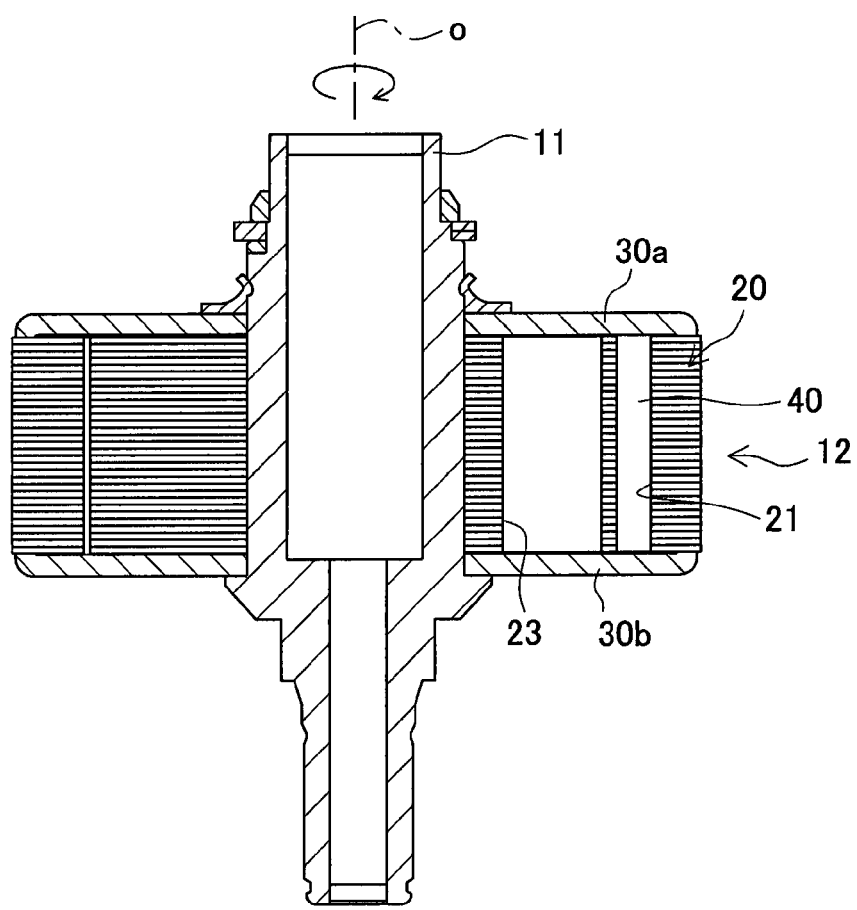
FIG. 2 is a cross-sectional view of the rotor taken along the axial direction in the first embodiment.

FIG. 1 is a plan view of a rotor 10 in an axial direction in the first embodiment. For convenience of explanation, an end plate 30 is not illustrated. FIG. 2 is a cross-sectional view of the rotor 10 taken along the axial direction, corresponding a cross-section along II-O-II in FIG. 1.

The rotor 10 includes a rotor core 12 configured such that magnetic steel sheets 20 are laminated and sandwiched between a first end plate 30a and a second end plate 30b as shown in FIG. 2. The magnetic steel sheets 20 are each formed in an annular shape by press to have a plurality of lightening holes 23 arranged on an inner circumferential side. The rotor core 12 has a plurality of magnet insert slots 21. In each of the slots 21, a magnet assembly 40 is inserted. The rotor core 12 is formed with protrusions 22 engaging with fit grooves 14 formed in a shaft 11. Accordingly, by engagement between the protrusions 22 and the grooves 14, the rotor 10 is held on the shaft 11.

Figure 3:
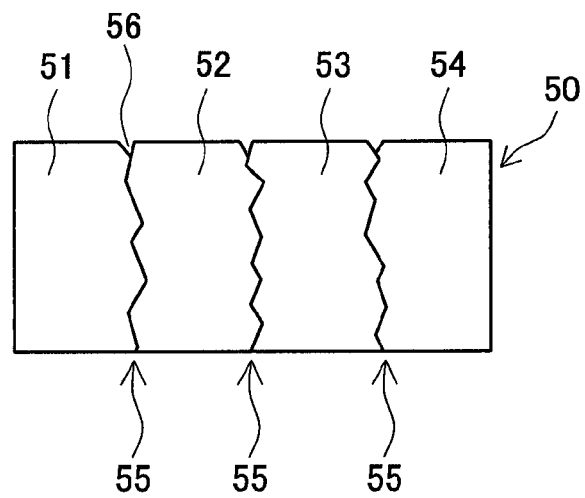
FIG. 3 is a plan view of a divided permanent magnet in the first embodiment.
Figure 4:
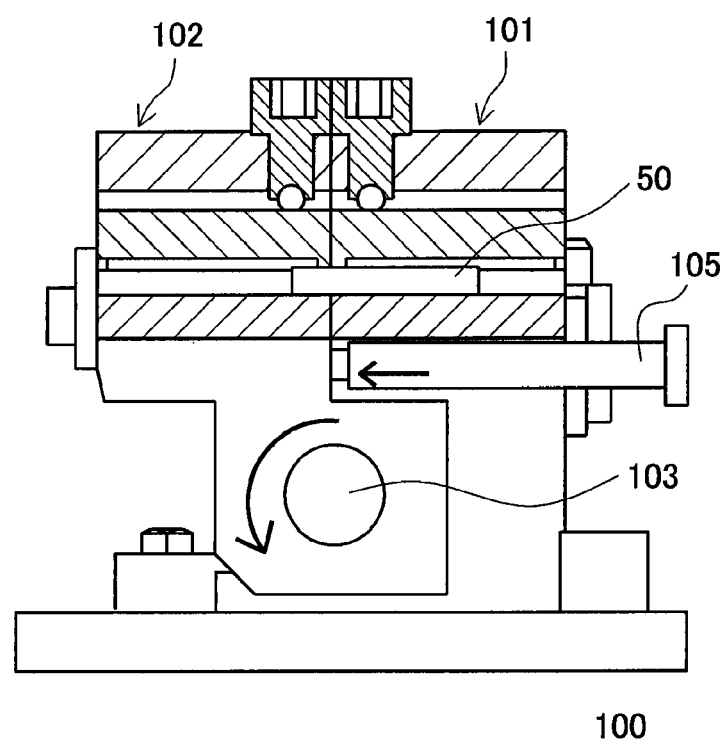
FIG. 4 is a side view of a divider in the first embodiment.
Figure 5:
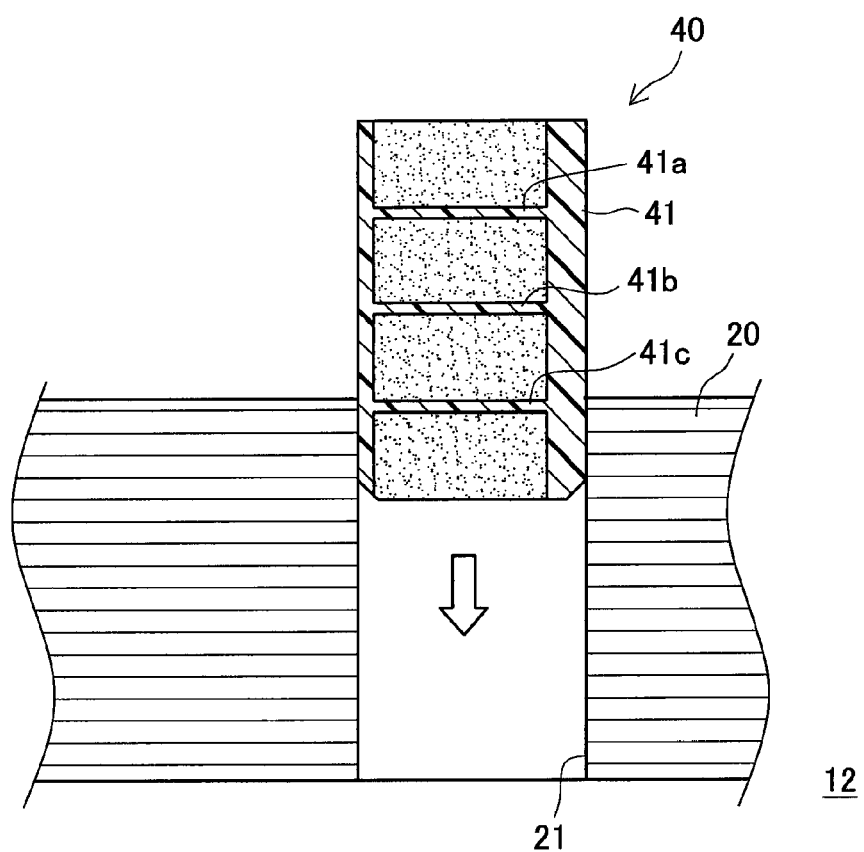
FIG. 5 is a cross-sectional view showing a state where a magnet assembly is inserted in a magnet insert slot in the first embodiment.

FIG. 3 is a plan view of a divided permanent magnet 50. FIG. 4 is a side view of a divider 100. FIG. 5 is a cross-sectional view showing a state where the magnet assembly 40 is to be inserted in the magnet insert slot 21. Although permanent magnet pieces 60 to be used as the magnet assembly 40 are illustrated as four pieces for convenience of explanation, the number of permanent magnet pieces may actually be increased or decreased according to performances and design specifications of a motor in which the rotor 10 is used.

The magnet assembly 40 is produced in such a manner that a permanent magnet 50 is split into four permanent magnet pieces 60, i.e., a first permanent magnet piece 51, a second permanent magnet piece 52, a third permanent magnet piece 53, and a fourth permanent magnet piece 54, and they are formed by resin molding. When it is referred to as the permanent magnet piece(s) 60, it represents any one of the first to fourth permanent magnet pieces 51 to 54 or all of them.

The permanent magnet 50 is split into a plurality of permanent magnet pieces 60 by the divider 100. The divider 100 is merely shown in the form of a conceptual structure in FIG. 4 and includes a fixed part 101 and a rotary part 102 rotatably supported on a rotary shaft 103. The rotary part 102 is rotated about the rotary shaft 103 in association with forward movement of a knock pin 105. At that time, the permanent magnet 50 held by the fixed part 101 and the rotary shaft 103 respectively is split into a configuration shown in FIG. 3. When the permanent magnet 50 is to be split, recesses such as splitting recesses 56 are preferably provided in advance in the permanent magnet 50. Such splitting recesses 56 provided in advance serve as start points of splitting of splitting sections 55 and to facilitate uniform division. The divider 100 may also have different configurations from an example shown in FIG. 4.

Figure 6:
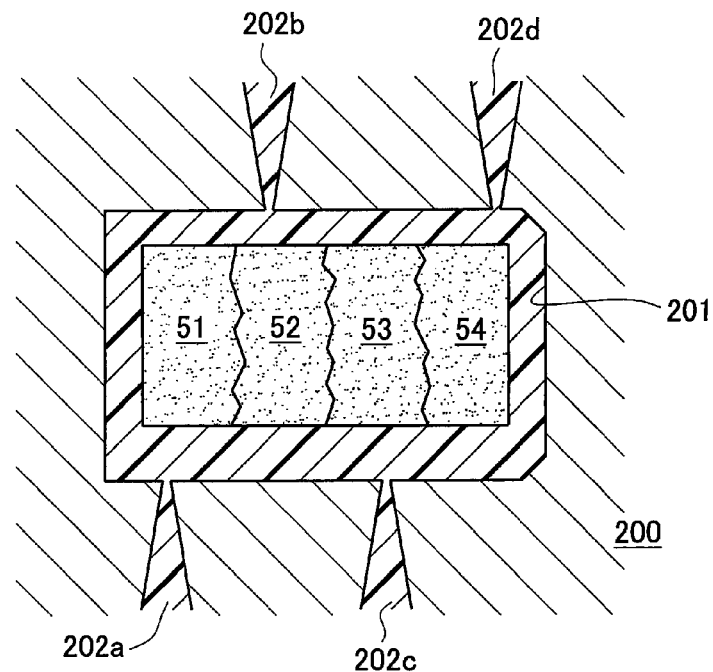
FIG. 6 is a schematic cross-sectional view showing a state where the permanent magnet pieces are being resin-molded in the first embodiment.
Figure 7:
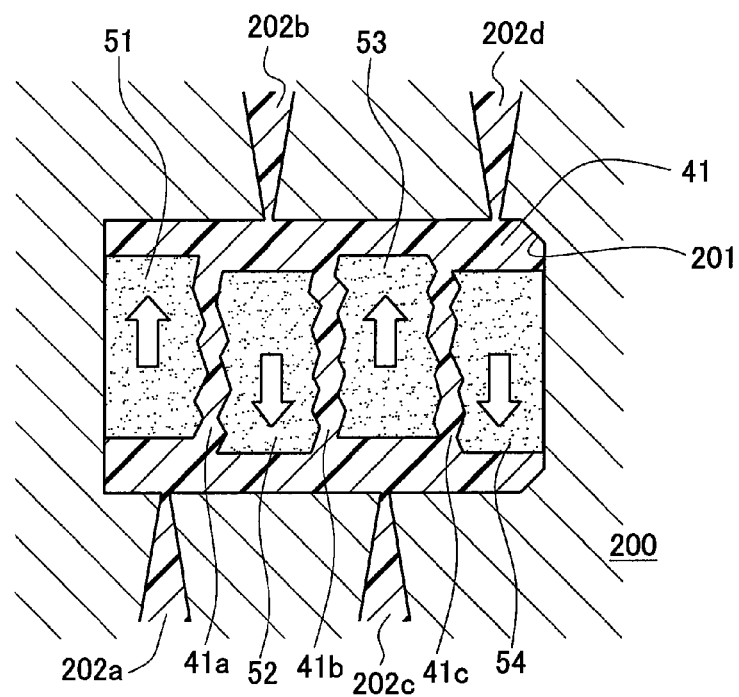
FIG. 7 is a schematic cross-sectional view showing a state where the permanent magnet pieces are being further resin-molded in the first embodiment.

FIG. 6 is a schematic cross-sectional view showing a state before the permanent magnet pieces 60 are resin-molded. FIG. 7 is a schematic cross-sectional view showing a state where the permanent magnet pieces 60 are resin-molded. A molding die 200 includes a cavity 201 in which the first to fourth permanent magnet pieces 51 to 54 are to be placed for insert molding and a plurality of gates 202 each opening into the cavity 201 to supply resin therein. The number of gates 202 is set equal to the number of dividing the permanent magnet 50. Accordingly, in the first embodiment using four permanent magnet pieces 60, i.e., the first to fourth permanent magnet pieces 51 to 54, four gates 202 are provided, which are referred to as a first gate 202a, a second gate 202b, a third gate 202c, and a fourth gate 202d.

Those first gate 202a, second gate 202b, third gate 202c, and fourth gate 202d are located respectively in positions so that the adjacent permanent magnet pieces 60, i.e., the first to fourth permanent magnet pieces 51 to 54, are displaced respectively in a direction perpendicular to a stack direction of the permanent magnet pieces 60. Specifically, as shown in FIGS. 6 and 7, the first gate 202a and the third gate 202c are provided to open on the same surface of the molding die 200 and the second gate 202b and the fourth gate 202d are provided to open in a surface opposite the former surface on which the first gate 202a and the third gate 202c open. Further, the first gate 202a to the fourth gate 202d are placed in a staggered (zig-zag) arrangement. In the case where four or more gates 202 are provided, even though it is not illustrated, they are arranged in the staggered arrangement as with the first to fourth gates 202a to 202d.

In this molding die 200, the divided permanent magnet 50 is placed. The permanent magnet 50 having been divided into four pieces in the divider 100 as mentioned above is preferably carried in the cavity 201 by handling the first to fourth permanent magnet pieces 51 to 54 all at once. Then, resin is supplied into the cavity 201 through the gates 202 to perform insert molding. At that time, through the use of the pressure of resin to be supplied, the resin is supplied into the dividing sections 55, thereby moving the first to fourth permanent magnet pieces 51 to 54 as shown in FIG. 7. Since the first gate 202a to the fourth gate 202d are located in the staggered arrangement, the first to fourth permanent magnet pieces 51 to 54 are thus displaced in the staggered arrangement.

Since the first permanent magnet piece 51 to the fourth permanent magnet piece 54 are produced by splitting the permanent magnet 50, the dividing sections 55 exist between the adjacent permanent magnet pieces 60 and the split surfaces have irregularities. The irregularities come out of mating engagement, for example, when the positions of the first magnet piece 51 and the second magnet piece 52 are displaced from each other in the direction perpendicular to the stack direction of the permanent magnet pieces 60. Accordingly, when the first to fourth permanent magnet pieces 51 to 54 are placed in the staggered arrangement, gaps are generated between the permanent magnet pieces 60. When resin flows in those gaps, a first resin wall 41a is formed between the first magnet piece 51 and the second magnet piece 52, a second resin wall 41b is formed between the second magnet piece 52 and the third magnet piece 53, and a third resin wall 41c is formed between the third magnet piece 53 and the fourth permanent magnet piece 54. It is to be noted that those gaps are not needed to be as wide as shown in FIGS. 6 and 7. Accordingly, the thickness of the first resin wall 41a to the third resin wall 41c is determined to be enough to provide necessary insulation between the permanent magnet pieces 60.

Although it is not illustrated, guide pins are provided in the molding die 200 to support side surfaces of the permanent magnet pieces 60. These guide pins are placed respectively on a front side and a back side in a vertical direction to the drawing sheets of FIGS. 6 and 7 so that a plurality of guide pins support the side surfaces of each permanent magnet piece 60. With those guide pins, the first to fourth permanent magnet pieces 51 to 54 even in the staggered arrangement can be guided. It is therefore expected to place the first to fourth permanent magnet pieces 51 to 54 in predetermined positions. Since each of the guide pins is sufficiently thin, resultant holes formed in corresponding portions of the completed resin molded portion 41 do not disturb the insulation properties. If needed, the holes formed in the resin molded portion 41 may be filled with resin after die releasing.

As above, the first permanent magnet piece 51 to the fourth permanent magnet piece 54 are insert-molded, forming the resin molded portion 41 around the first to fourth permanent magnet pieces 51 to 54. The thus formed magnet assembly 40 is then taken out of the molding die 200. The magnet assembly 40 thus formed is installed in the rotor core 12 as shown in FIG. 5. The rotor 10 is completed.

The manufacturing method of the rotor 10 in the first embodiment is configured as above and accordingly provides the following operations and effects.

Firstly, a cost reduction for forming the magnet assembly 40 can be reduced. The manufacturing method of the rotor 10 in the first embodiment including dividing the permanent magnet 50 into the first to fourth permanent magnet pieces 51 to 54, arranging and resin-molding these first to fourth permanent magnet pieces 51 to 54 to form the magnet assembly 40, and placing the magnet assembly 40 in the rotor 10. This method further includes placing the first to fourth permanent magnet pieces 51 to 54 all together in the molding die 200 for resin molding, and moving the first to fourth permanent magnet pieces 51 to 54 within the molding die 200 by a moving means provided in the molding die 200 to move the first to fourth permanent magnet pieces 51 to 54, thereby forming the magnet assembly 40.

The moving means is configured so that a plurality of the gates 202 are provided in the molding die 200, the first gate 202a of the gates 202 is located in a position facing the side surface of the first permanent magnet piece 51 of the permanent magnet pieces 60, the second gate 202b is located in a position facing the side surface of the second permanent magnet piece 52 located adjacent to the first permanent magnet piece 51, the first gate 202a and the second gate 202b are provided on the opposite planes of the molding die 200. After the permanent magnet pieces 60 are placed in the molding die 200, resin is supplied through the first gate 202a and the second gate 202b into the molding die 200, thereby moving the first permanent magnet piece 51 and the second permanent magnet piece 52 in opposite directions, thus forming the magnet assembly 40.

Accordingly, during resin-molding of the magnet assembly 40, the first to fourth permanent magnet pieces 51 to 54 can be moved by inflow pressure of resin from the first to fourth gates 202a to 202d of the molding die 200. This can omit an operation of moving the split permanent magnet pieces 60. Since there is no need to use a mechanical moving means to move the first to fourth permanent magnet pieces 51 to 54, equipment costs can be reduced, leading to a reduction in lead time. Consequently, it contributes to cost reduction of the magnet assembly 40 and hence cost reduction of the rotor 10.

If a motor using the rotor 10 is configured for high output, which is mentioned as the problem to be solved, it causes a problem with generating eddy currents in the permanent magnet pieces 60. This generation of eddy currents may generate heat and loss. This is caused by the need to increase the output by flowing a large current in a coil of a stator for high output of the motor. It is therefore conceivable to reduce the size of the permanent magnet pieces 60 (increasing the number of dividing the permanent magnet 50) to prevent the generation of eddy currents. However, small-sized permanent magnet pieces 60 are hard to handle and carry. It is also difficult to apply an insulation treatment to such magnet pieces 60 individually or machining such as grinding for enhancing the dimensional accuracy of the permanent magnet pieces 60.

In the steps of manufacturing the rotor 10 in the first embodiment, in contrast, after the permanent magnet 50 is split, the first to fourth permanent magnet pieces 51 to 54 are carried into the cavity 201 of the molding die 200 all at once, and the first to fourth permanent magnet pieces 51 to 54 are moved within the cavity 201 by injection pressure of resin from the gates 202 to place the permanent magnet pieces 60 at spaced intervals. Accordingly, it is possible to eliminate the need to handle the small-sized permanent magnet pieces 60 individually and make a manufacturing apparatus simpler. This can reduce processing costs and shorten manufacturing steps, and also contribute to shortening of lead time.

Since the permanent magnet 50 split into the first to fourth permanent magnet pieces 51 to 54 is used, the cost reduction of the rotor 10 can be achieved. The permanent magnet pieces 60 are formed by splitting and therefore an increase in a yield ratio of the permanent magnet 50 is anticipated. The cost reduction of the rotor 10 is thus expected. Since the first to fourth permanent magnet pieces 51 to 54 are displaced in the direction perpendicular to the stack direction of the permanent magnet pieces 60, the gaps between the permanent magnet pieces 60 can be made wider. This can ensure the insulation between the permanent magnet pieces 60. Further, the permanent magnet pieces 60 are moved in one direction and the gaps between the magnet pieces 60 can be widened, so that the moving means can be made simple. This respect also can contribute to the cost reduction of the rotor 10.

A second embodiment of the present invention will be explained below. The second embodiment is substantially the same as the first embodiment excepting the position of a gate 202 in a molding die 200 and additional movable pins 205 to restrict an amount of movement of the permanent magnet pieces 60. Thus, different configurations from those of the first embodiment are explained below referring to the drawings.

Figure 8:
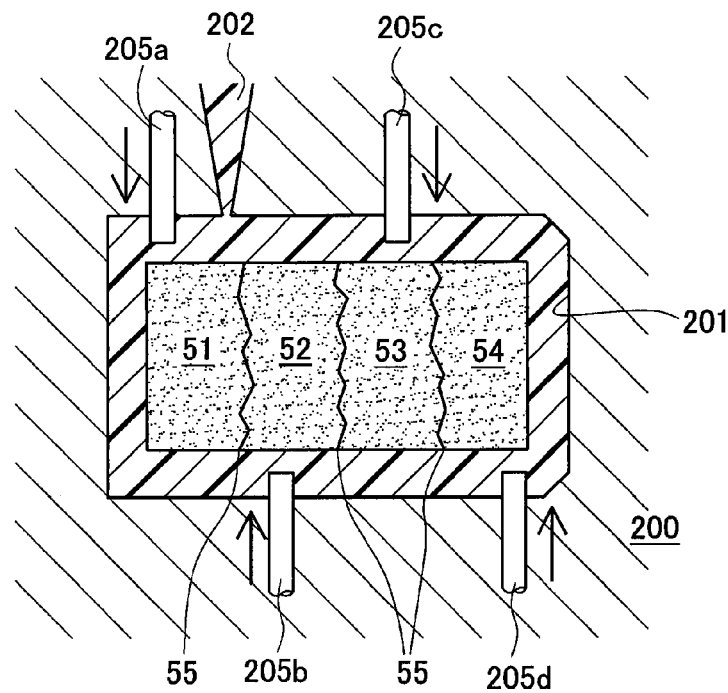
FIG. 8 is a schematic cross-sectional view showing a state where permanent magnet pieces are being resin-molded in a second embodiment.
Figure 9:
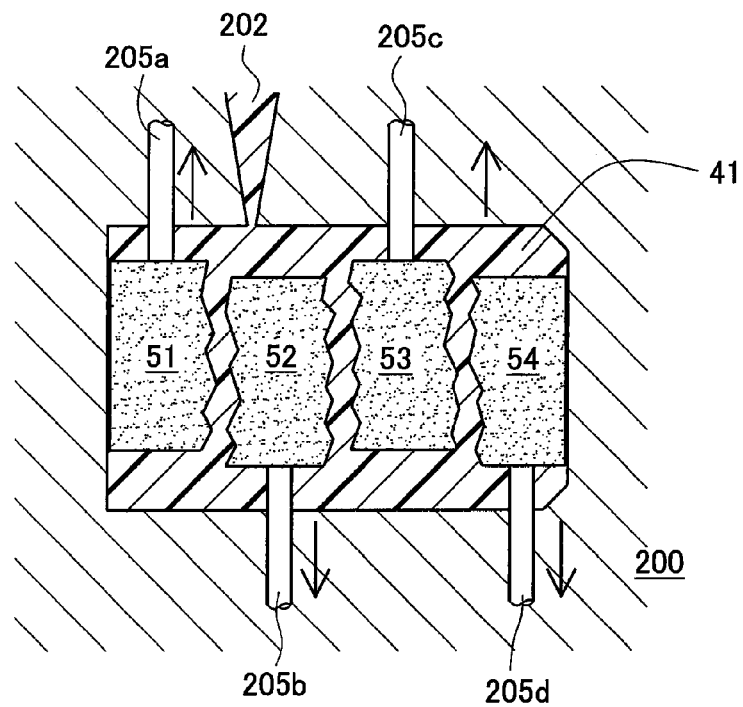
FIG. 9 is a schematic cross-sectional view showing a state where the permanent magnet pieces are being further resin-molded in the second embodiment.

FIG. 8 is a schematic cross-sectional view showing a state before the permanent magnet pieces 60 are resin-molded in the second embodiment. FIG. 9 is a schematic cross-sectional view showing a state where the permanent magnet pieces 60 are resin-molded. In the molding die 200 for forming the permanent magnet 50 in the second embodiment, unlike the molding die 200 in the first embodiment, a single gate 202 and a plurality of movable pins 205 are provided. In correspondence with the number of splitting the permanent magnet 50, that is, the number of permanent magnet pieces 60 to be placed in the cavity 201 of the molding die 200, the movable pins 205 are provided. For convenience of explanation, the movable pin 205 corresponding to the first permanent magnet piece 51 is referred to as a first movable pin 205a. A second movable pin 205b corresponds to the second permanent magnet piece 52. A third movable pin 205c corresponds to the third permanent magnet piece 53. A fourth movable pin 205d corresponds to the fourth permanent magnet piece 54.

The movable pins 205 are operated to move forward and backward with respect to the molding die 200. The pins 205 are moved forward in the cavity 201 and then held in predetermined positions. In FIG. 8, the pins 205 are in most-forward positions. Specifically, the permanent magnet pieces 60 obtained by splitting are placed in the cavity 201 and then the pins 205 are moved forward to respective positions shown in FIG. 8. Thereafter, resin is supplied through the gate 202. The position of the gate 202 is illustrated to open on the surface in which the first pin 205a and the third pin 205c are inserted in FIGS. 8 and 9. As an alternative, for example, the gate 202 may be provided in any one of other five surfaces of the molding die 200.

When resin is filled in the cavity 201 through this gate 202, the first to fourth permanent magnet pieces 51 to 54 are moved within the cavity 201. However, the movable pins 205 are held in place and thus the first to fourth permanent magnet pieces 51 to 54 are moved to respective positions shown in FIG. 9. It is preferable to control the flow of resin in the cavity 201 to move the first to fourth permanent magnet pieces 51 to 54 to such positions as shown in FIG. 9. If needed, the first gate 202a to the fourth gate 202d of the first embodiment may be provided to open on the surfaces respectively opposite the first pin 205a to the fourth pin 205d, thereby moving the first to fourth permanent magnet pieces 51 to 54.

By filling resin through the gate 202 as above, the first to fourth permanent magnet pieces 51 to 54 are moved and positioned by the movable pins 205. These pins 205 are then moved backward. The timing to move backward the pins 205 is preferably set as the time after the resin molded portion 41 is formed as shown in FIG. 9. Portions of the resin molded portion 41 from which the pins 205 are withdrawn become voids. To fill those voids, resin may be additionally supplied. Thereafter, the thus formed magnet assembly 40 is taken out of the molding die 200. This magnet assembly 40 is installed in the rotor core 12 as shown in FIG. 5, completing the rotor 10.

The method of manufacturing the rotor 10 in the second embodiment is configured as above and accordingly provides the following operations and effects.

The manufacturing method of the rotor 10 in the second embodiment can reduce the costs for forming the magnet assembly 40 as the effect of the manufacturing method of the rotor 10 in the first embodiment. In addition to the use of pressure of resin to be supplied through the gate 202 as the moving means, the movable pins 205 are prepared. The positions of the permanent magnet pieces 60 in the magnet assembly 40 can therefore be controlled. The movable pins 205 arranged as above can prevent the permanent magnet pieces 60 from coming too close to the outer surface of the resin molded portion 41.

A third embodiment of the present invention will be explained below. The third embodiment is substantially the same as the first embodiment excepting the positions of gates 202 in a molding die 200 and others. Different configurations from the first embodiment are explained below referring to the drawings.

Figure 10:
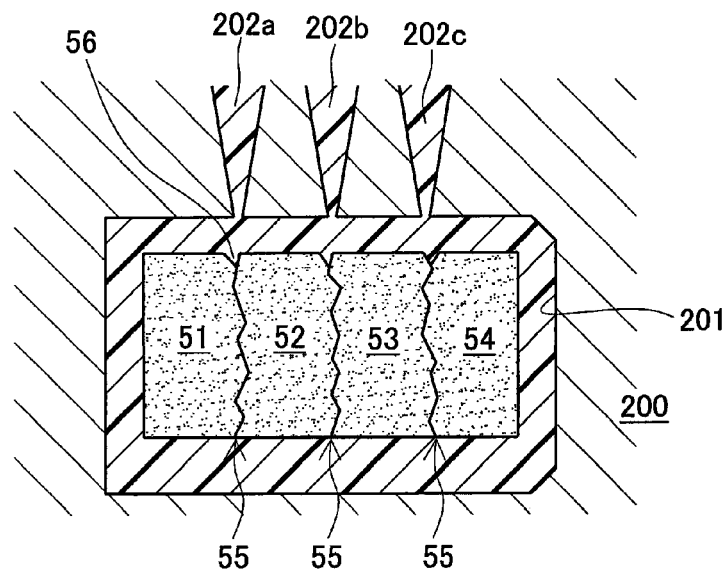
FIG. 10 is a schematic cross-sectional view showing a state where permanent magnet pieces are being resin-molded in a third embodiment.
Figure 11:
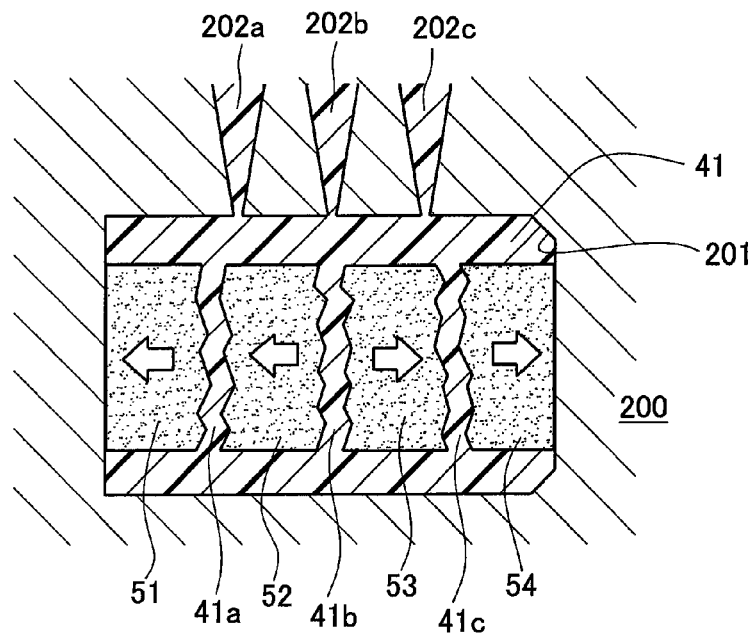
FIG. 11 is a schematic cross-sectional view showing a state where the permanent magnet pieces are being further resin-molded in the third embodiment.

FIG. 10 is a schematic cross-sectional view showing a state before the permanent magnet pieces 60 are resin-molded in the third embodiment. FIG. 11 is a schematic cross-sectional view showing a state where the permanent magnet pieces 60 are resin-molded. The molding die 200 includes a cavity 201 in which the first permanent magnet piece 51 to the fourth permanent magnet piece 54 are to be placed for insert molding, and a plurality of gates 202 opening into the cavity 201 to supply resin. The number of gates 202 is equal to the number of dividing sections 55 of the permanent magnet 50. The number of dividing the permanent magnet 50 is four, equal to those in the above embodiments, and hence the number of gates 202 in the molding die 200 is three. They are referred to as a first gate 202a, a second gate 202b, and a third gate 202c.

The positions of these first gate 202a, second gate 202b, and third gate 202c are determined in accordance with the positions of the dividing sections 55 and the splitting recesses 56 of the permanent magnet 50 to be placed in the cavity 201. Specifically, as shown in FIG. 10, the splitting recesses 56 are provided on one plane of the columnar permanent magnet 50, and the gates 202 are arranged to open on one surface of the molding die 200 to face the splitting recesses 56.

In the above molding die 200, the divided permanent magnet 50 is placed. The permanent magnet 50 has been divided in advance by the divider 100 as mentioned above. It is preferable to handle and carry four pieces, i.e., the first to fourth permanent magnet pieces 51 to 54, all at once into the cavity 201. Then, resin is supplied into the cavity 201 through the gates 202 to perform insert molding. At that time the resin is supplied to the dividing sections by use of pressure of resin to be supplied, thereby moving the first to fourth permanent magnet pieces 51 to 54 into such a state as shown in FIG. 11.

As above, the first to fourth permanent magnet pieces 51 to 54 are moved to respective appropriate positions, so that a first resin wall 41a is formed between the first permanent magnet piece 51 and the second permanent magnet piece 52, a second resin wall 41b is formed between the second permanent magnet piece 52 and the third permanent magnet piece 53, and a third resin wall 41c is formed between the third permanent magnet piece 53 and the fourth permanent magnet piece 54. Further, the resin molded portion 41 is formed around the first to fourth permanent magnet pieces 51 to 54. Thereafter, the thus formed magnet assembly 40 is taken out of the molding die 200 and then installed in the rotor core 12 as shown in FIG. 5, completing the rotor 10.

The method of manufacturing the rotor 10 in the third embodiment is configured as above and provides the following operations and effects.

Firstly, the costs for forming the magnet assembly can be reduced. The manufacturing method of the rotor 10 in the third embodiment includes dividing the permanent magnet 50 to form the first to fourth permanent magnet pieces 51 to 54, arranging the first to fourth permanent magnet pieces 51 to 54 and resin-molding them to form the magnet assembly 40, and installing the magnet assembly 40 in the rotor 10. The method further includes placing the first to fourth permanent magnet pieces 51 to 54 all together in the molding die 200 used for resin molding, and moving the first to fourth permanent magnet pieces 51 to 54 within the molding die 200 by the moving means provided in the molding die 200 to move the first to fourth permanent magnet pieces 51 to 54, thereby forming the magnet assembly 40.

Further, the plurality of gates 202 are provided in the molding die 200 to supply resin for resin molding into the molding die 200. Those gates 202 are the moving means. Specifically, the gates 202 are provided to open on one surface of the molding die 200 and spaced at intervals respectively corresponding to the vicinities of the dividing sections 55 of the adjacent permanent magnet pieces. After the first to fourth permanent magnet pieces 51 to 54 are put in the molding die 200, resin for resin molding is supplied into the molding die 200, flowing in the dividing sections 55 formed between mating surfaces of adjacent permanent magnet pieces, thereby forming the magnet assembly 40.

Accordingly, during resin-molding of the magnet assembly, the first to fourth permanent magnet pieces 51 to 54 can be moved by injection pressure of the resin supplied through the gates 202 of the molding die 200. This can omit an operation of moving the split permanent magnet pieces 60. Since there is no need to use a mechanical moving means to move the first to fourth permanent magnet pieces 51 to 54, equipment costs can be reduced, leading to a reduction in lead time. Consequently, it contributes to cost reduction of the magnet assembly 40 and hence cost reduction of the rotor 10.

It is expected that the splitting recesses 56 provided in the permanent magnet 50 can serve to facilitate splitting of the permanent magnet 50 and further contribute to movement of the split magnets within the cavity 201 of the molding die 200. This is because the first gate 202a to the third gate 202c are located in the positions corresponding to the splitting recesses 56 so that resin injected through the gates 202 flow in the splitting recesses 56, thereby facilitating movement of the permanent magnet pieces 60 to right and left. The shape of each splitting recess 56 is therefore preferably designed in consideration of this respect.

In the third embodiment, the permanent magnet 50 is split to form the first to fourth permanent magnet pieces 51 to 54. The manufacturing method of the rotor 10 in the first embodiment is also applicable to permanent magnet pieces obtained by dividing the permanent magnet 50 by cutting.

A fourth embodiment of the present invention will be explained below. The fourth embodiment is substantially the same as the first embodiment excepting the position of a gate 202 in a molding die 200 and the addition of a movable die 210. Different configurations from the first embodiment are explained below referring to the drawings.

Figure 12:
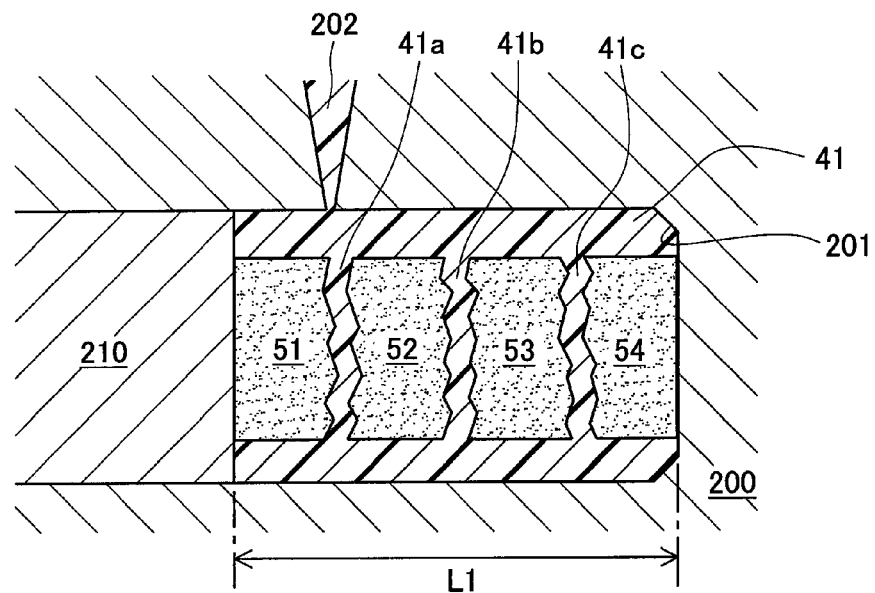
FIG. 12 is a schematic cross-sectional view showing a state where permanent magnet pieces are placed in a cavity and resin is filled therein in a fourth embodiment.
Figure 13:
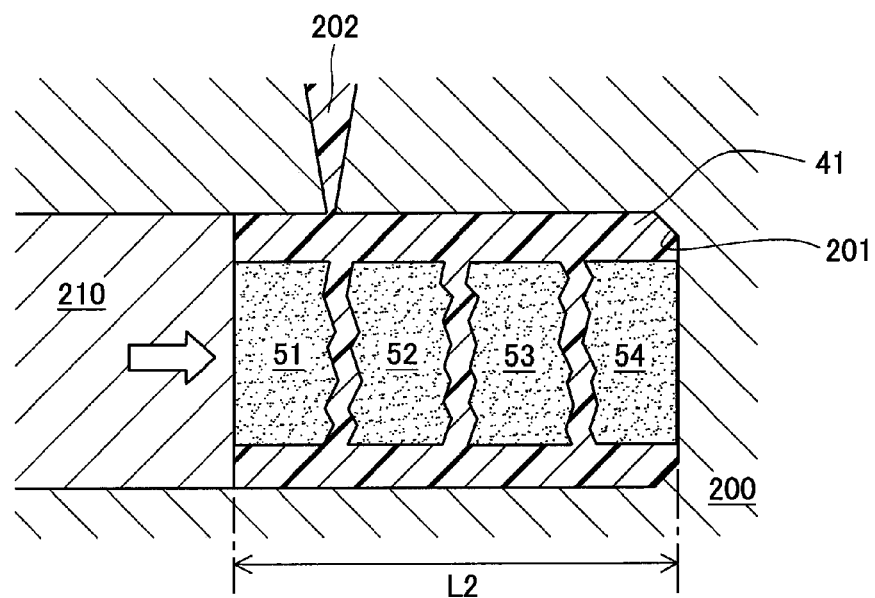
FIG. 13 is a schematic cross-sectional view showing a state where a movable die is moved in the fourth embodiment.

FIG. 12 is a schematic cross-sectional view showing a state where the permanent magnet pieces 60 are placed in the cavity 201 and resin is filled therein in the fourth embodiment. FIG. 13 is a schematic cross-sectional view showing a state where the movable die 210 is moved. The molding die 200 includes a cavity 201 in which the first to fourth permanent magnet pieces 51 to 54 are to be placed for insert molding, and a gate 202 opening into the cavity 201 to supply resin. The movable die 210 is also provided to be movable in a stack direction of the permanent magnet pieces 60. A withdrawal end position of the movable die 210 is determined such that the dimension of the cavity 201 has a pre-movement length L1 longer than a final length L2 of the completed magnet assembly 40, as shown in FIG. 12. An advance end position of the die 210 is determined to correspond to the final length L2 of the magnet assembly 40, as shown in FIG. 13.

By use of the above molding die 200, the first to fourth permanent magnet pieces 51 to 54 are insert-molded to form the magnet assembly 40. This procedure begins with placing the first to fourth permanent magnet pieces 51 to 54 in the cavity 201 of the molding die 200. At that time, the intervals between the first to fourth permanent magnet pieces 51 to 54 are preferably determined so that the intervals are wide as shown in FIG. 12. To be concrete, after the first to fourth permanent magnet pieces 51 to 54 are placed, these permanent magnet pieces 60 are moved by use of a mechanical means or the like. At that time, it is not necessary to handle or carry the permanent magnet pieces 60 and they may be slid within the molding die 200.

After the first to fourth permanent magnet pieces 51 to 54 are placed in the cavity 201 as shown in FIG. 12, resin is filled through the gate 202. Then, the movable die 210 is moved so that the length of the magnet assembly 40 becomes equal to the final length L2 as shown in FIG. 13. Although it is not illustrated, it is preferable to provide another gate for discharging resin in addition to the gate 202. When the resin in the state shown in FIG. 13 is solidified, the magnet assembly 40 is completed. Thereafter, the magnet assembly 40 is installed in the rotor 10.

The manufacturing method of the rotor 10 in the fourth embodiment is configured as above and provides the following operations and effects.

The manufacturing method of the rotor 10 in the fourth embodiment can reduce the costs for forming the magnet assembly 40 as in the manufacturing method of the rotor 10 in the first embodiment. However, by the use of the movable die 210, it is possible to prevent air bubbles from entering in the first resin wall 41a to the third resin wall 41c when they are formed, thus ensuring more reliable insulation between the adjacent permanent magnet pieces 60. It is effective when higher insulation is needed.

The permanent magnet 50 in the fourth embodiment is divided by splitting into the first to fourth permanent magnet pieces 51 to 54. However, the invention in the fourth embodiment does not necessarily need to use the permanent magnet pieces 60 divided by splitting. Alternatively, permanent magnet pieces 60 divided by cutting or other techniques may be used.

The present invention is explained in the above embodiments but is not limited thereto. The present invention may be embodied in other specific forms without departing from the essential characteristics thereof.

For instance, the first to fourth embodiments may be combined appropriately. Thus, the movable die 210 of the fourth embodiment may be used in the molding die 200 of the first embodiment. In this case, as the moving means to create gaps between the permanent magnet pieces 60 placed in the cavity 201, the pressure of resin injected through the gates 202 is used.

Further, the configuration of the rotor 10 and the number of dividing the permanent magnet 50 to be used for the magnet assembly 40 may be appropriately changed according to specifications of a motor in which the rotor 10 is to be used. The shape of the molding die and the arrangement of the guide pins may be changed appropriately according to the shape and the specifications of the permanent magnet pieces 60.

DESCRIPTION OF THE REFERENCE SIGNS

11 Shaft
12 Rotor core
14 Fit groove
20 Magnetic steel sheet
21 Magnet insert slot
40 Magnet assembly
41a First resin wall
41b Second resin wall
41c Third resin wall
50 Permanent magnet
55 Dividing section
56 Splitting recess
60 Permanent magnet piece
100 Divider
101 Fixed part
102 Rotary part
103 Rotary shaft
105 Knock pin
200 Molding die
201 Cavity
202 Gate
205 Movable pin
210 Movable die

The invention claimed is:

1. A method of manufacturing a rotor including: dividing a permanent magnet into a plurality of permanent magnet pieces; arranging and resin-molding the permanent magnet pieces to form a magnet assembly; and placing the magnet assembly in a rotor,
wherein the method comprises:
placing the permanent magnet pieces all together in a molding die for use in resin-molding; and
moving the permanent magnet pieces within the molding die by moving means for moving the permanent magnet pieces to form the magnet assembly, the moving means being provided in the molding die,
wherein the permanent magnet pieces are formed by splitting the permanent magnet,
the molding die is provided with a gate through which a resin for resin-molding flows in the molding die, and
the gate serves as the moving means,
wherein the gate includes a plurality of gates provided in the molding die,
the plurality of gates include a first gate provided in a surface of the die facing a side surface of a first permanent magnet piece of the permanent magnet pieces and a second gate provided on a surface of the die facing a side surface of a second permanent magnet piece located adjacent to the first permanent magnet piece,
the first gate and the second gate are provided in opposite surfaces of the molding die, and
after the permanent magnet pieces are placed in the molding die, the resin is supplied in the molding die through the first gate and the second gate to move the first permanent magnet piece and the second permanent magnet piece in opposite directions so that the permanent magnet pieces are resin-molded to form the magnet assembly.

2. The method of manufacturing a rotor according to claim 1,
wherein pins for supporting the side surfaces of the permanent magnet pieces are provided in the number corresponding to the number of the permanent magnet pieces to be placed in the molding die,
the pins include a first pin placed in a surface of the die facing a side surface of the first permanent magnet piece of the permanent magnet pieces and a second pin placed in a surface of the die facing a side surface of the second permanent magnet piece located adjacent to the first permanent magnet piece,
the first pin and the second pin are placed respectively in opposite surfaces of the molding die,
after the permanent magnet pieces are placed in the molding die, the first pin and the second pin are moved to positions short of the corresponding permanent magnet pieces,
the resin for resin-molding is supplied in the molding die to move the first permanent magnet piece into contact with the first pin and the second permanent magnet piece into contact with the second pin to form the magnet assembly.

3. A method of manufacturing a rotor including: dividing a permanent magnet into a plurality of permanent magnet pieces; arranging and resin-molding the permanent magnet pieces to form a magnet assembly; and placing the magnet assembly in a rotor,
wherein the method comprises:
placing the permanent magnet pieces all together in a molding die for use in resin-molding; and
moving the permanent magnet pieces within the molding die by moving means for moving the permanent magnet pieces to form the magnet assembly, the moving means being provided in the molding die,
wherein the permanent magnet pieces are formed by splitting the permanent magnet,
the molding die is provided with a gate through which a resin for resin-molding flows in the molding die, and
the gate serves as the moving means,
wherein pins for supporting the side surfaces of the permanent magnet pieces are provided in the number corresponding to the number of the permanent magnet pieces to be placed in the molding die, the pins include a first pin placed in a surface of the die facing a side surface of the first permanent magnet piece of the permanent magnet pieces and a second pin placed in a surface of the die facing a side surface of the second permanent magnet piece located adjacent to the first permanent magnet piece, the first pin and the second pin are placed respectively in opposite surfaces of the molding die, after the permanent magnet pieces are placed in the molding die, the first pin and the second pin are moved to positions short of the corresponding permanent magnet pieces, the resin for resin-molding is supplied in the molding die to move the first permanent magnet piece into contact with the first pin and the second permanent magnet piece into contact with the second pin to form the magnet assembly.

4. A method of manufacturing a rotor including: dividing a permanent magnet into a plurality of permanent magnet pieces; arranging and resin-molding the permanent magnet pieces to form a magnet assembly; and placing the magnet assembly in a rotor, wherein the method comprises:

placing the permanent magnet pieces all together in a molding die for use in resin-molding; and moving the permanent magnet pieces within the molding die by moving means for moving the permanent magnet pieces to form the magnet assembly, the moving means being provided in the molding die, wherein the molding die is provided with a plurality of gates through which a resin for resin-molding flows in the molding die, the gates being the moving device, the gates are located in one surface of the molding die and spaced at intervals corresponding to vicinities of mating surfaces of the adjacent permanent magnet pieces, and after the permanent magnet pieces are placed in the molding die, the resin for use in resin-molding is supplied in the molding die to flow between the mating surfaces of the adjacent permanent magnet pieces to flow the magnet assembly.

5. A method of manufacturing a rotor including: dividing a permanent magnet into a plurality of permanent magnet pieces; arranging and resin-molding the permanent magnet pieces to form a magnet assembly; and placing the magnet assembly in a rotor, wherein the method comprises:

placing the permanent magnet pieces all together in a molding die for use in resin-molding; and moving the permanent magnet pieces within the molding die by moving means for moving the permanent magnet pieces to form the magnet assembly, the moving means being provided in the molding die, wherein the molding die is provided with a movable die for moving the permanent magnet pieces as the moving device, the movable die being placed in an end of the permanent magnet pieces in a stack direction thereof, a cavity defined by the molding die and the movable die is formed with a size larger than a final size of the magnet assembly in the stack direction of the permanent magnet pieces, after the permanent magnet pieces are placed in the molding die, the permanent magnet pieces are moved by another moving device to widen intervals between the permanent magnet pieces, and after the resin for resin-molding is supplied in the molding die, the movable die is moved toward the placed permanent magnet pieces to reduce the cavity so that the magnet assembly is formed with a predetermined size.

* * * * *